US012103312B2

(12) United States Patent
Mizutani et al.

(10) Patent No.: US 12,103,312 B2
(45) Date of Patent: Oct. 1, 2024

(54) INK REPLENISHMENT CONTAINER

(71) Applicant: SEIKO EPSON CORPORATION, Tokyo (JP)

(72) Inventors: Tadahiro Mizutani, Shiojiri (JP); Yoshihiro Koizumi, Shiojiri (JP); Taku Ishizawa, Matsumoto (JP); Tadashi Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 103 days.

(21) Appl. No.: 17/946,397

(22) Filed: Sep. 16, 2022

(65) Prior Publication Data

US 2023/0088212 A1 Mar. 23, 2023

(30) Foreign Application Priority Data

Sep. 17, 2021 (JP) ................................. 2021-151637

(51) Int. Cl.
*B41J 2/175* (2006.01)

(52) U.S. Cl.
CPC ....... *B41J 2/17509* (2013.01); *B41J 2/17596* (2013.01)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 6,164,768 A * 12/2000 Murphy ............... B41J 2/17503 347/85
10,350,896 B2 7/2019 Ishizawa et al.
(Continued)

FOREIGN PATENT DOCUMENTS

CN 207955030 U 10/2018
EP 0998393 B1 12/2002
(Continued)

OTHER PUBLICATIONS

U.S. Appl. No. 17/956,401, filed Sep. 29, 2022 in the name of Tadahiro Mizutani et al.
(Continued)

*Primary Examiner* — Anh T Vo
(74) *Attorney, Agent, or Firm* — Oliff PLC

(57) ABSTRACT

There is provided an ink replenishment container for replenishing ink into an ink tank via an ink inlet flow path member having a plurality of flow paths, the ink replenishment container including a container main body, an ink outlet forming portion, and an outlet valve unit. The outlet valve unit includes a valve housing mounted to provide a gap with an inner peripheral surface of a tubular portion in the tubular portion, a sealing member, and a valve body movable between a valve close state in contact with the sealing member and a valve open state separated from the sealing member. The valve body has a partition contact portion capable of contacting a partition of the ink inlet flow path member. The valve housing has a through-hole that communicates with the gap, and the through-hole communicates with the ink inlet flow path member in the valve open state.

10 Claims, 10 Drawing Sheets

(58) Field of Classification Search
CPC .. B41J 2/17523; B41J 2/1754; B41J 2/17596; B41J 2002/17573
See application file for complete search history.

(56) References Cited

U.S. PATENT DOCUMENTS

| | | | | |
|---|---|---|---|---|
| 10,974,512 | B2 * | 4/2021 | Ishizawa | B41J 2/17523 |
| 11,059,299 | B2 * | 7/2021 | Ishizawa | B41J 29/13 |
| 11,111,061 | B2 | 9/2021 | Nagai et al. | |
| 2005/0088497 | A1 | 4/2005 | Katayama et al. | |
| 2017/0355191 | A1 * | 12/2017 | Mizutani | B41J 2/17536 |
| 2018/0250943 | A1 * | 9/2018 | Fukasawa | B41J 29/13 |
| 2018/0250944 | A1 | 9/2018 | Ishizawa et al. | |
| 2020/0307872 | A1 | 10/2020 | Nagai et al. | |
| 2021/0253312 | A1 | 8/2021 | Teshima | |
| 2021/0261301 | A1 | 8/2021 | Masukawa et al. | |

FOREIGN PATENT DOCUMENTS

| | | | |
|---|---|---|---|
| EP | 1403067 | A1 | 3/2004 |
| EP | 3381697 | A1 | 10/2018 |
| EP | 3470229 | A1 | 4/2019 |
| EP | 3470230 | A1 | 4/2019 |
| EP | 3939795 | A1 | 1/2022 |
| JP | H09-066959 | A | 3/1997 |
| JP | 2014-213565 | A | 11/2014 |
| JP | 2018-144230 | A | 9/2018 |
| JP | 2018-144281 | A | 9/2018 |
| JP | 2020-164231 | A | 10/2020 |
| JP | 2021-130254 | A | 9/2021 |
| JP | 2021-130488 | A | 9/2021 |

OTHER PUBLICATIONS

Mar. 14, 2024 U.S. Office Action issued in U.S. Appl. No. 17/956,401.

* cited by examiner

INK REPLENISHMENT CONTAINER

The present application is based on, and claims priority from JP Application Serial Number 2021-151637, filed Sep. 17, 2021, the disclosure of which is hereby incorporated by reference herein in its entirety.

BACKGROUND

1. Technical Field

The present disclosure relates to an ink replenishment container.

2. Related Art

In the related art, as an example of an ink ejecting apparatus, an ink jet printer capable of performing a print with ink on a printing medium such as printing paper by ejecting the ink from a print head toward the printing medium is known. Such an ink jet printer is an ink replenishment type printer that is used by replenishing ink in an ink tank. JP-A-2018-144281 discloses an ink replenishment container used for replenishing ink to an ink tank having an ink replenishment type.

The ink replenishment container in JP-A-2018-144281 has room for improvement from the viewpoint of quickly replenishing a liquid or facilitating the manufacture or maintenance of the ink replenishment container. An ink replenishment container having a configuration in which at least one of these improvements is improved is desired.

SUMMARY (1) According to a first aspect of the present disclosure, there is provided an ink replenishment container for replenishing ink into an ink tank of a printer via an ink inlet flow path member having a plurality of flow paths partitioned by a partition. The ink replenishment container includes: a container main body configured to accommodate the ink; an ink outlet forming portion coupled to the container main body and including a tubular portion having an ink outlet; and an outlet valve unit mounted in the tubular portion, in which the outlet valve unit includes a valve housing mounted to provide a gap with an inner peripheral surface of the tubular portion in the tubular portion, a sealing member mounted in the valve housing and having an opening through which the ink inlet flow path member is inserted and removed, and a valve body mounted in the valve housing to be movable in a central axis direction of the ink outlet, and movable between a valve close state in which the valve body is in contact with the sealing member and a valve open state in which the valve body is pressed by the ink inlet flow path member and separated from the sealing member, the valve body includes a partition contact portion having an end surface configured to come into contact with the partition of the ink inlet flow path member, and the valve housing includes a through-hole which communicates with the gap, and the through-hole communicates with the ink inlet flow path member in the valve open state.

(2) According to a second aspect of the present disclosure, there is provided an ink replenishment container for replenishing ink into the ink tank via an ink inlet flow path member having a plurality of flow paths partitioned by a partition. The ink replenishment container includes: a container main body configured to accommodate the ink; an ink outlet forming portion coupled to the container main body and including a tubular portion having an ink outlet; and an outlet valve unit mounted in the tubular portion, in which the outlet valve unit includes a valve housing that has an engaging portion with the tubular portion and is detachably mounted in the tubular portion via the engaging portion, a spring member housed and supported in the valve housing, a sealing member mounted in the valve housing, located on a tip side of the ink outlet than the spring member in a central axis direction of the ink outlet, and having an opening through which the ink inlet flow path member is inserted and removed, and a valve body mounted to be movable in the central axis direction in the valve housing, and movable between a valve close state in which the valve body is in contact with the sealing member by urging of the spring member and a valve open state in which the valve body is pressed by the ink inlet flow path member in a direction opposite to the urging direction and separated from the sealing member, and the valve housing has a retaining portion of the sealing member.

(3) According to a third aspect of the present disclosure, there is provided an ink replenishment container for replenishing ink into an ink tank of a printer via an ink inlet flow path member having a plurality of flow paths partitioned by a partition. The ink replenishment container includes: a container main body configured to accommodate the ink; an ink outlet forming portion coupled to the container main body and including a tubular portion having an ink outlet; and an outlet valve unit mounted in the tubular portion, in which the tubular portion has a tubular portion side engaging portion configured to engage with the outlet valve unit, and the outlet valve unit is configured such that a spring valve unit and a slit valve unit are interchanged and selectively mounted, the spring valve unit including a valve housing having an engaging portion configured to engage with the tubular portion side engaging portion of the tubular portion, a spring member housed and supported in the valve housing, a sealing member mounted in the valve housing, located on a tip side of the ink outlet than the spring member in a central axis direction of the ink outlet, and having an opening through which the ink inlet flow path member is inserted and removed, and a valve body mounted to be movable in the central axis direction in the valve housing, and movable between a valve close state in which the valve body is in contact with the sealing member by urging of the spring member and a valve open state in which the valve body is pressed by the ink inlet flow path member in a direction opposite to the urging direction and separated from the sealing member, and the slit valve unit including a slit valve having a slit through which the ink inlet flow path member is inserted into and removed from the valve body in a radial direction, the slit valve unit having an engaging portion configured to engage with the tubular portion side engaging portion.

DESCRIPTION OF EXEMPLARY EMBODIMENTS

A. First Embodiment

Figure 1:
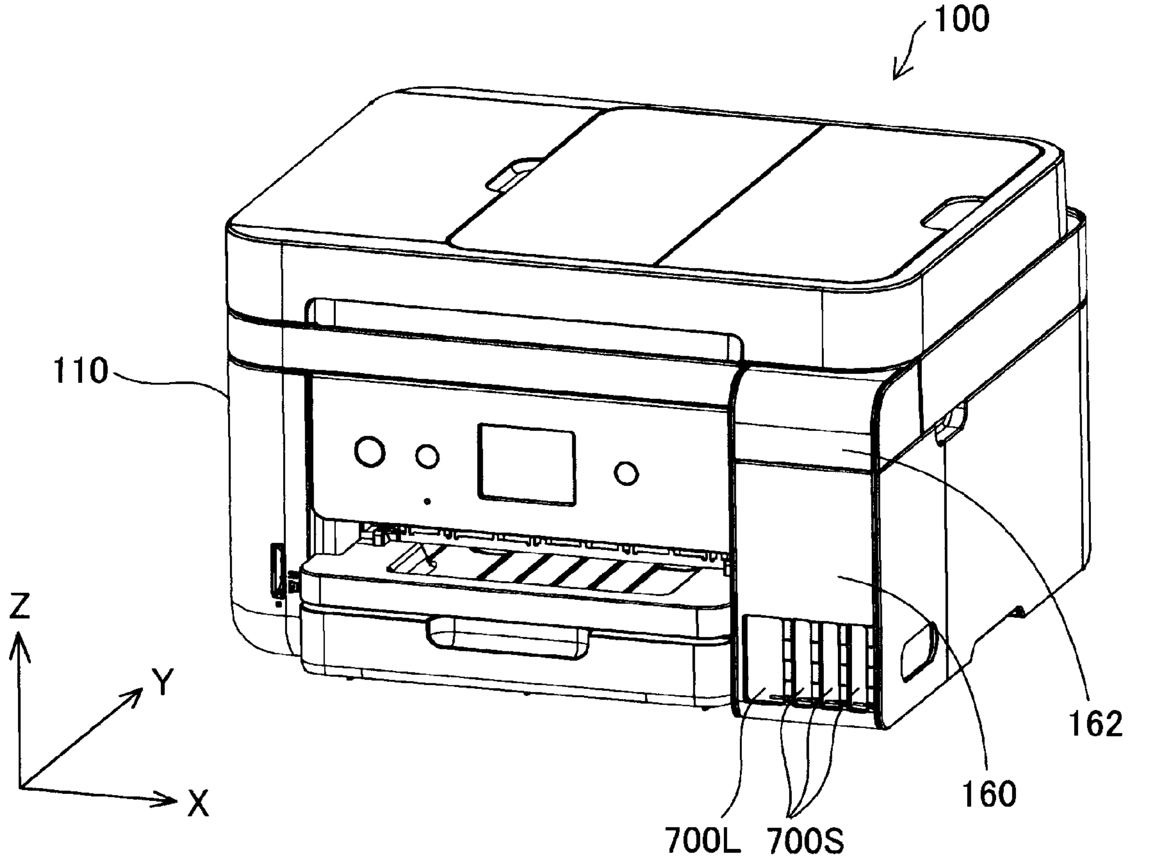
FIG. 1 is a perspective view of a printer according to a first embodiment.

FIG. 1 is a perspective view of a printer 100 according to a first embodiment. The printer 100 is an ink jet printer that ejects ink onto a printing medium for printing. In FIG. 1, XYZ axes orthogonal to each other are drawn. The X-axis corresponds to a width direction of the printer 100, the Y-axis corresponds to a depth direction of the printer 100, and the Z-axis corresponds to a height direction of the printer 100. The printer 100 is installed on a horizontal installation surface defined by the X-axis direction and the Y-axis direction. The "X-axis direction" means a concept in which a +X direction and a −X direction are combined. In the same manner, the "Y-axis direction" means a concept in which a +Y direction and a −Y direction are combined, and the "Z-axis direction" means a concept in which a +Z direction and a −Z direction are combined.

The printer 100 has a housing 110. Inside the housing 110, a carriage (not illustrated) that can move in a main scanning direction (X-axis direction) is provided. The carriage is provided with a print head that ejects ink onto a printing medium. An ink tank accommodating unit 160 accommodating a plurality of ink tanks 700S and 700L is provided at one end of a front surface of the housing 110. The ink tank accommodating unit 160 has a lid 162 that can be opened and closed at a top portion of the ink tank accommodating unit 160. The ink tank 700S is a small-capacity tank, and the ink tank 700L is a large-capacity tank. Meanwhile, in the following description, the ink tank 700S and the ink tank 700L are simply referred to as an "ink tank 700" without distinction. Each ink tank 700 is coupled to a print head of the carriage by a tube (not illustrated). That is, the ink tank 700 is a stationary ink tank that is not mounted on the carriage of the printer 100. Further, each ink tank 700 is an ink replenishment type ink tank to which ink is replenished from an ink replenishment container when the remaining amount of ink is low. In the present embodiment, the ink tank 700 is a stationary ink tank, and the ink tank 700 may be mounted on the carriage of the printer 100.

Figure 2:
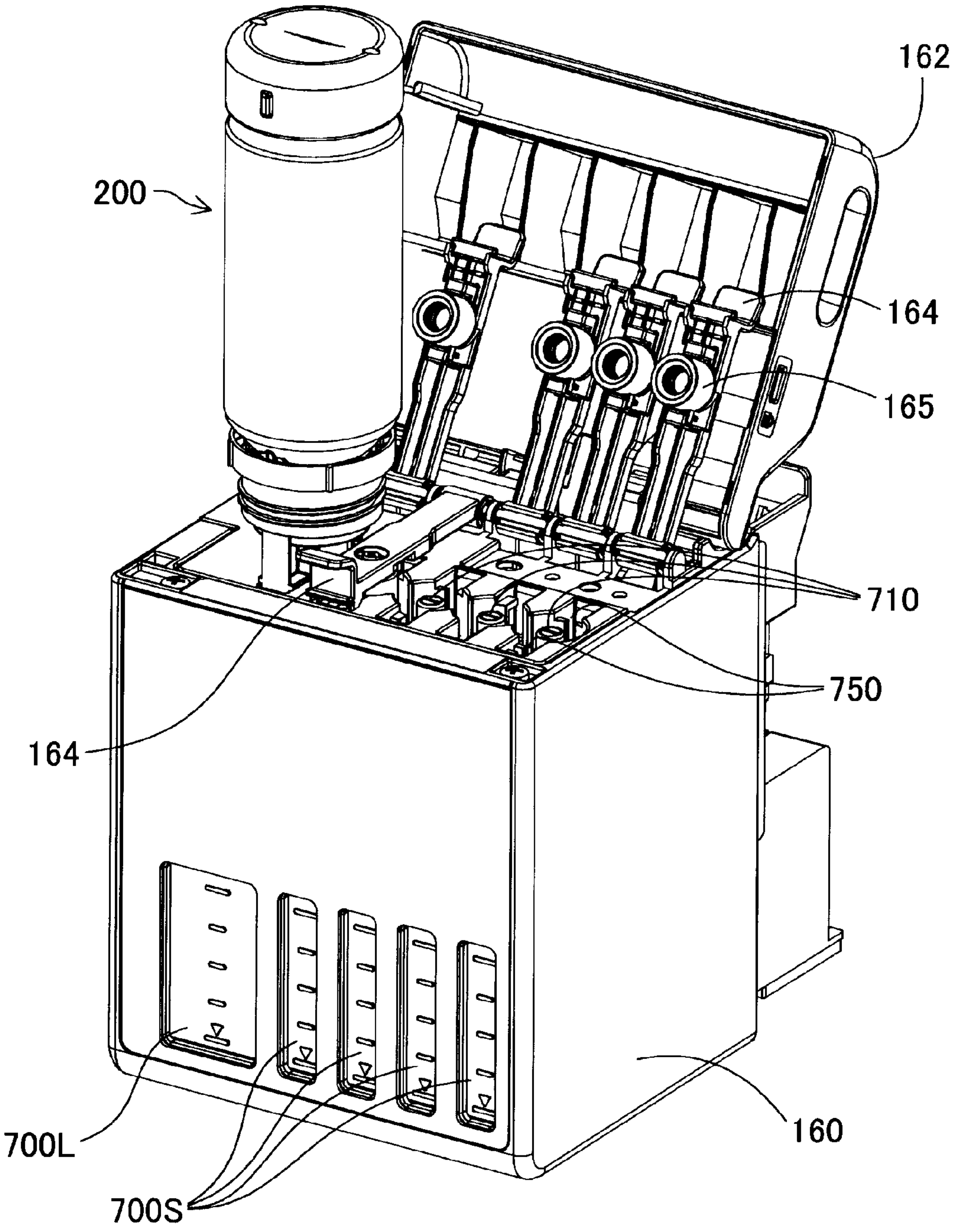
FIG. 2 is a perspective view illustrating a state in which ink is replenished to an ink tank by using an ink replenishment container.

FIG. 2 is a perspective view illustrating a state in which ink is replenished to the ink tank 700 by using an ink replenishment container 200. A front surface of each ink tank 700 is formed of a transparent member, and the remaining amount of ink in each ink tank 700 can be visually recognized from an outside. When the remaining amount of ink is low, as illustrated in FIG. 2, it is possible to open the lid 162 and replenish ink from an ink inlet flow path member 710 of the ink tank 700.

On an upper surface of each ink tank 700, the tubular ink inlet flow path member 710 for replenishing ink to the ink tank 700 is provided. The ink tank accommodating unit 160 includes a sealing cap member 164 having a sealing cap 165 for sealing a tip of the ink inlet flow path member 710. In a state in which ink is not replenished into the ink tank 700, the tip of the ink inlet flow path member 710 is sealed with the sealing cap 165 of the sealing cap member 164. When the ink is replenished into the ink tank 700, the sealing cap member 164 is separated from the ink inlet flow path member 710, and a tip portion of the ink replenishment container 200 is inserted at a position of the ink inlet flow path member 710 to replenish the ink. Two recess portions 750 that fit with a fitting portion (described below) of the ink replenishment container 200 are provided around the ink inlet flow path member 710. These recess portions 750 have a rotationally symmetric shape of 180 degrees based on the ink inlet flow path member 710.

In the present specification, the term "ink replenishment" means an operation of supplying ink to the ink tank 700 so as to increase the remaining amount of ink. Meanwhile, it is not necessary to fill-up the ink tank 700 with ink by "ink replenishment". Further, "ink replenishment" includes an operation of filling the empty ink tank 700 with ink when the printer 100 is used for the first time.

Figure 3:
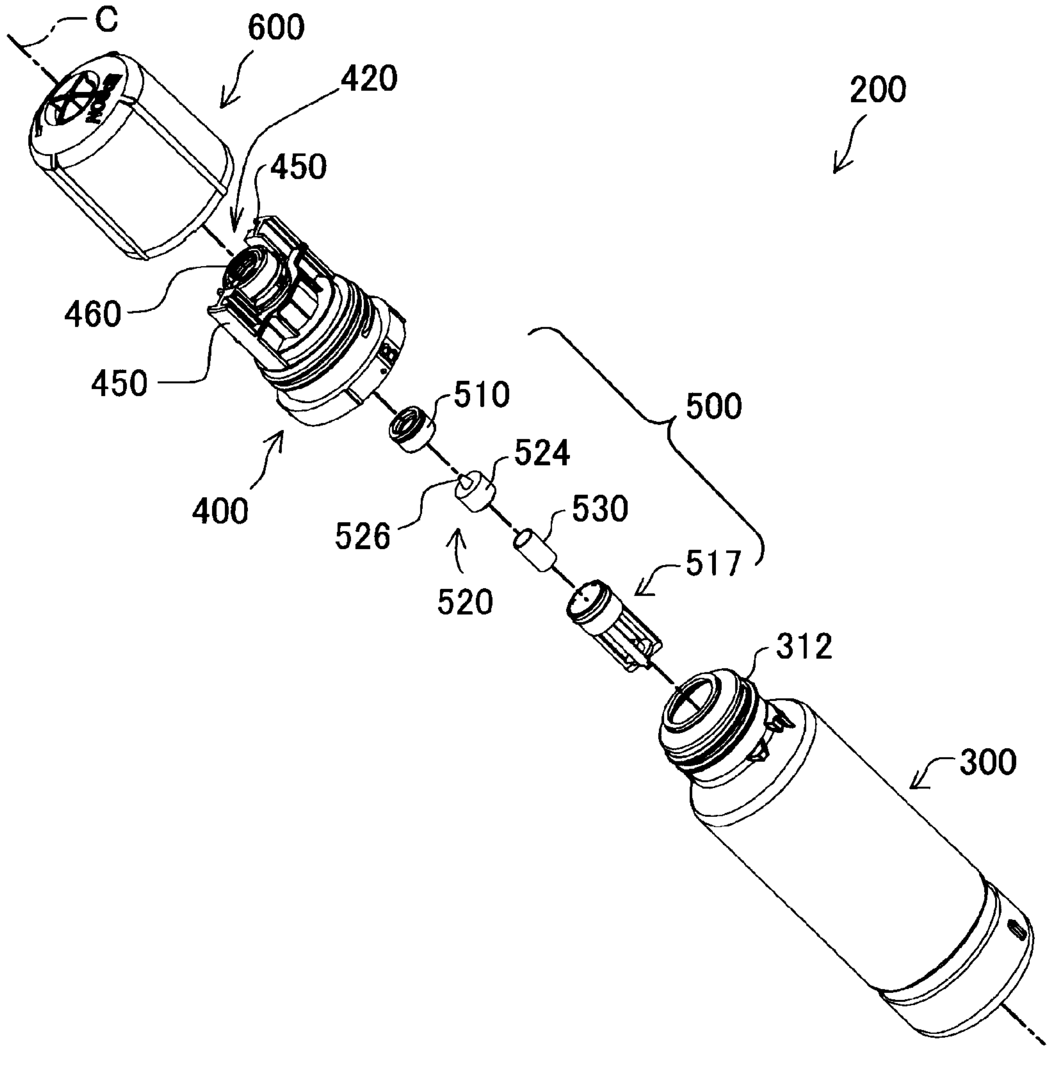
FIG. 3 is an exploded perspective view of the ink replenishment container according to the first embodiment.

FIG. 3 is an exploded perspective view of the ink replenishment container 200 according to the first embodiment. The ink replenishment container 200 has a container main body 300 capable of accommodating ink, an ink outlet forming portion 400 that forms an ink outlet 460, an outlet valve unit 500, and a cap 600 attached to the ink outlet forming portion 400. An upper end side of the ink replenishment container 200, which is a cap 600 side, is referred to as a "tip side", and a lower end side of the ink replenishment container 200, which is a container main body 300 side, is referred to as a "rear end side". The container main body 300 is a hollow cylindrical container having an opening on the tip side. An external screw 312 for mounting the ink outlet forming portion 400 is provided at a small-diameter portion at a tip of the container main body 300.

The ink outlet 460 is provided at a tip of the ink outlet forming portion 400. The ink outlet forming portion 400 is used by being coupled to the container main body 300. The ink outlet forming portion 400 includes a tubular portion 420 having the ink outlet 460. The outlet valve unit 500 is mounted in the tubular portion 420. Therefore, the outlet valve unit 500 can be regarded as a member constituting a part of the ink outlet forming portion 400. At a time of ink replenishment to the ink tank 700, the ink inlet flow path member 710 (FIG. 2) of the ink tank 700 is inserted into the ink outlet 460.

The outlet valve unit 500 is configured to seal the ink outlet 460 so that ink does not leak to the outside in a non-replenishment state in which the ink is not replenished into the ink tank 700, and is configured to release the sealing so that the ink flows into the ink inlet flow path member 710 in a replenishment state in which the ink is replenished into the ink tank 700.

Figure 4:
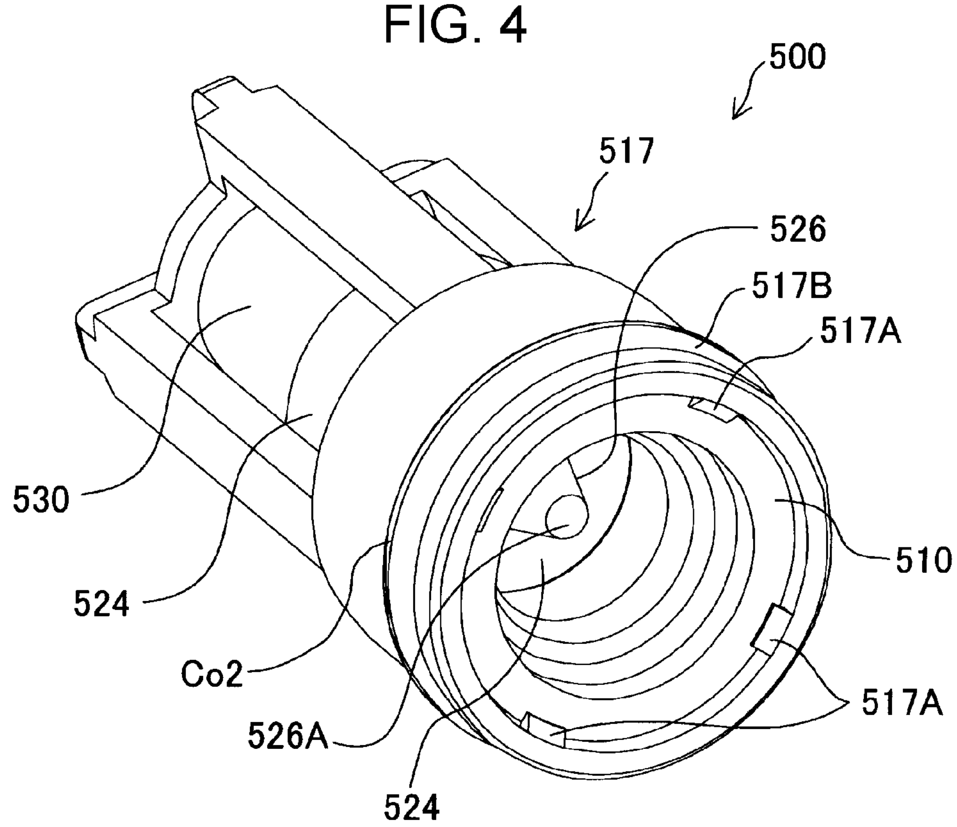
FIG. 4 is a first perspective view of an outlet valve unit.
Figure 5:
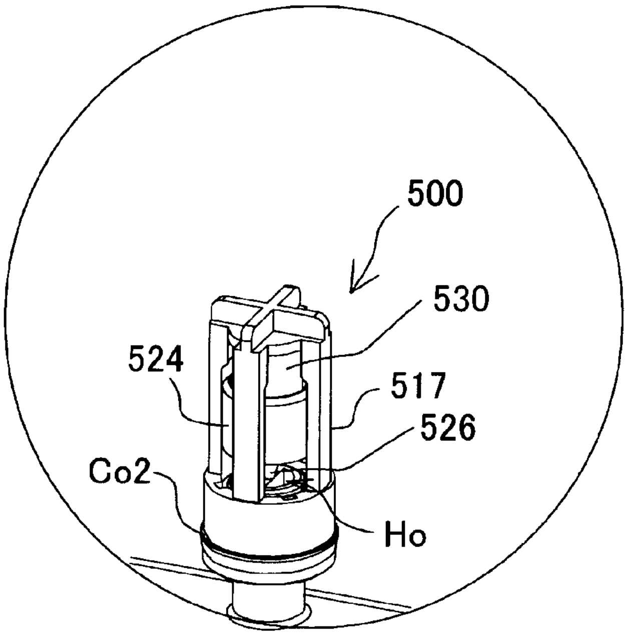
FIG. 5 is a second perspective view of the outlet valve unit.

FIG. 4 is a first perspective view of the outlet valve unit 500. FIG. 5 is a second perspective view of the outlet valve unit 500. FIG. 5 illustrates a state in which the ink inlet flow path member 710 is inserted into the outlet valve unit 500. As illustrated in FIGS. 3 to 5, the outlet valve unit 500 includes a valve housing 517, a sealing member 510, a valve body 520, and a spring member 530. In the present disclosure, a direction parallel to a central axis C of the ink replenishment container 200 is referred to as an "axial direction", and a direction outward from the central axis C is referred to as a "diameter direction".

The valve housing 517 accommodates the spring member 530, the sealing member 510, and the valve body 520 inside. The valve housing 517 has a substantially cylindrical shape in which a tip in the axial direction is open and the other end is closed. The ink inlet flow path member 710 can be inserted and removed through an opening at the tip of the valve housing 517. As illustrated in FIG. 4, the valve housing 517 has a retaining portion 517A of the sealing member 510 and an engaging portion 517B with the tubular portion 420, on the tip side. Therefore, the outlet valve unit 500 is integrated in a state of being assembled with the tubular portion 420. In addition, since the outlet valve unit 500 is detachable by itself, it is easy to manufacture or handle the outlet valve unit 500, and the outlet valve unit 500 can be transported by itself, and the outlet valve unit 500 can be replaced when the ink replenishment container 200 is reused. The valve housing 517 is mounted so as to provide a gap with the tubular portion 420 in a diameter direction, in the tubular portion 420. As illustrated in FIG. 5, the valve housing 517 has a total of four through-holes Ho penetrating in a direction intersecting the axial direction. The through-hole Ho communicates with the gap in the diameter direction between the valve housing 517 and the tubular portion 420. The through-hole Ho is formed so as to extend in the axial direction.

As illustrated in FIGS. 3 to 5, the spring member 530 is housed inside the valve housing 517. The spring member 530 is housed on the rear end side in the axial direction in the valve housing 517, and is supported by the valve housing 517. The spring member 530 can be made of metal, for example. In the present embodiment, the spring member 530 is a coil spring.

The sealing member 510 is mounted inside the valve housing 517. The sealing member 510 is located on the tip side of the ink outlet 460 than the spring member 530 in the axial direction. The sealing member 510 has a substantially ring-shaped shape. The sealing member 510 can be formed of, for example, a rubber member (elastomer) having elasticity. The sealing member 510 has an opening through which the ink inlet flow path member 710 can be inserted and removed.

The valve body 520 is movably mounted inside the valve housing 517 in the axial direction. The valve body 520 has a cylindrical portion 524 and a projection portion 526. The valve body 520 has a configuration in which the projection portion 526 is disposed on an end surface of the cylindrical portion 524, which is a substantially cylindrical member. The cylindrical portion 524 faces an inner surface of the valve housing 517. The cylindrical portion 524 is configured to be slidable by being guided by the inner surface of the valve housing 517. Therefore, an opening and closing operation of the valve body 520 is appropriately performed. A valve open state and a valve close state of the valve body 520 will be described below. The valve body 520 can be formed of, for example, a thermoplastic resin such as polyethylene or polypropylene. As illustrated in FIG. 4, the projection portion 526 of the valve body 520 has a partition contact portion 526A having a circular end surface that can come into contact with a partition wall 714, which will be described below, of the ink inlet flow path member 710. The projection portion 526 is formed such that a cross-sectional area in an orthogonal direction orthogonal to the axial direction on the rear end side is larger than the cross-sectional area on the tip side having the partition contact portion 526A in the axial direction. The partition contact portion 526A has a circular end surface, and is not limited to the circular end surface, and may have an end surface having any shape such as an elliptical end surface as long as the operation and effect of the present disclosure are achieved.

The valve body 520 may be in the "valve close state" and the "valve open state". Specifically, the valve body 520 is urged toward the sealing member 510 by the spring member 530. When the cylindrical portion 524 comes into contact with the sealing member 510 with such urging, the valve body 520 is in the "valve close state". In this "valve close state", the cylindrical portion 524 comes into contact with the sealing member 510, so that an opening in the axial direction is closed. Further, the valve body 520 is pressed by the ink inlet flow path member 710 in a direction opposite to an urging direction of the spring member 530. When the cylindrical portion 524 is separated from the sealing member 510 by such pressing, the valve body 520 is in the "valve open state". In this "valve open state", the cylindrical portion 524 is separated from the sealing member 510, so that the opening is formed in the axial direction.

The components of the ink replenishment container 200 other than the outlet valve unit 500 can be formed of, for example, a thermoplastic resin such as polyethylene or polypropylene.

As illustrated in FIG. 3, two fitting portions 450 are provided around the ink outlet 460. These fitting portions 450 are positioning members that position the ink replenishment container 200 by being fit into the recess portions 750 (FIG. 2) provided around the ink inlet flow path member 710 of the ink tank 700. The positioning is, for example, at least one of a function that the ink replenishment container 200 for replenishing yellow ink is fitted into the recess portion 750 corresponding to the ink tank 700 accommodating yellow ink and the ink replenishment container 200 for replenishing ink of other colors such as magenta ink and cyan ink is not fitted into the recess portion 750 to prevent ink from being erroneously filled and a function of stabilizing an ink filling posture of the ink replenishment container as described below. The function of preventing ink from being erroneously filled is not limited to the color of the ink, and is, for example, a function to prevent dye ink and pigment ink from being erroneously filled, for black ink. In the first embodiment, the two fitting portions 450 have a rotationally symmetric shape of 180 degrees based on a central axis C of the ink replenishment container 200. In the same manner, the recess portion 750 provided around the ink inlet flow path member 710 of the ink tank 700 has a rotationally symmetric shape of 180 degrees based on the ink inlet flow path member 710. At the time of ink replenishment, the fitting portion 450 of the ink replenishment container 200 is fitted into the recess portion 750 around the ink inlet flow path member 710 of the ink tank 700, so that an orientation of the ink replenishment container 200 is limited to two orientations, which are rotationally symmetric by 180 degrees. As a result, it is possible to maintain the ink replenishment container 200 in a stable posture during ink replenishment. Meanwhile, the fitting portion 450 can be omitted.

Figure 6:
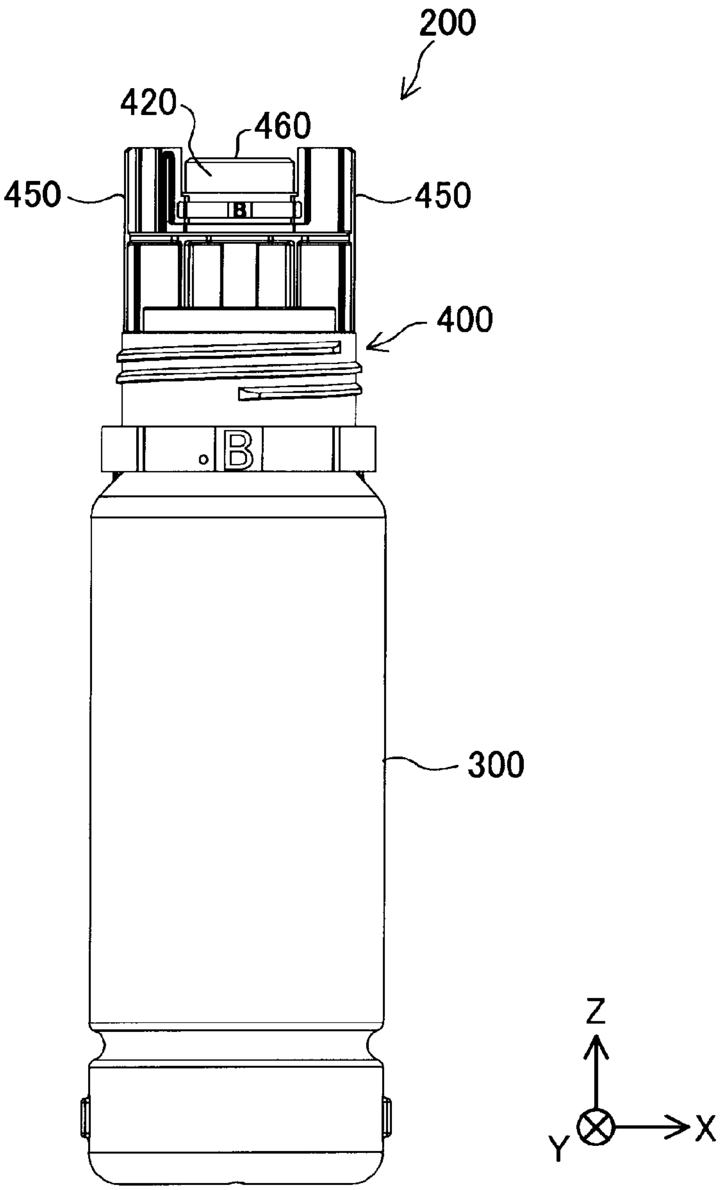
FIG. 6 is a front view of the ink replenishment container in a normal placement state.
Figure 7:
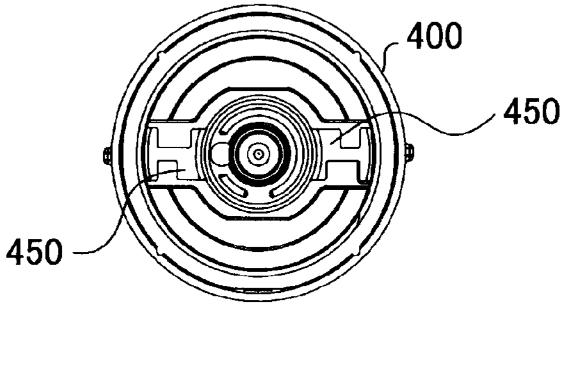
FIG. 7 is a plan view of FIG. 6.

FIG. 6 is a front view of the ink replenishment container 200 in a normal placement state, and FIG. 7 is a plan view of the ink replenishment container 200 in the normal placement state. The "normal placement state of the ink replenishment container 200" means a state in which a bottom of the container main body 300 is placed to face down on a horizontal surface such as a desk. As illustrated in FIG. 2 described above, ink is replenished to the ink tank 700 in an inverted posture with the tip side of the ink replenishment container 200 facing downward. FIGS. 6 and 7 illustrate a state in which the cap 600 is separated.

Figure 8:
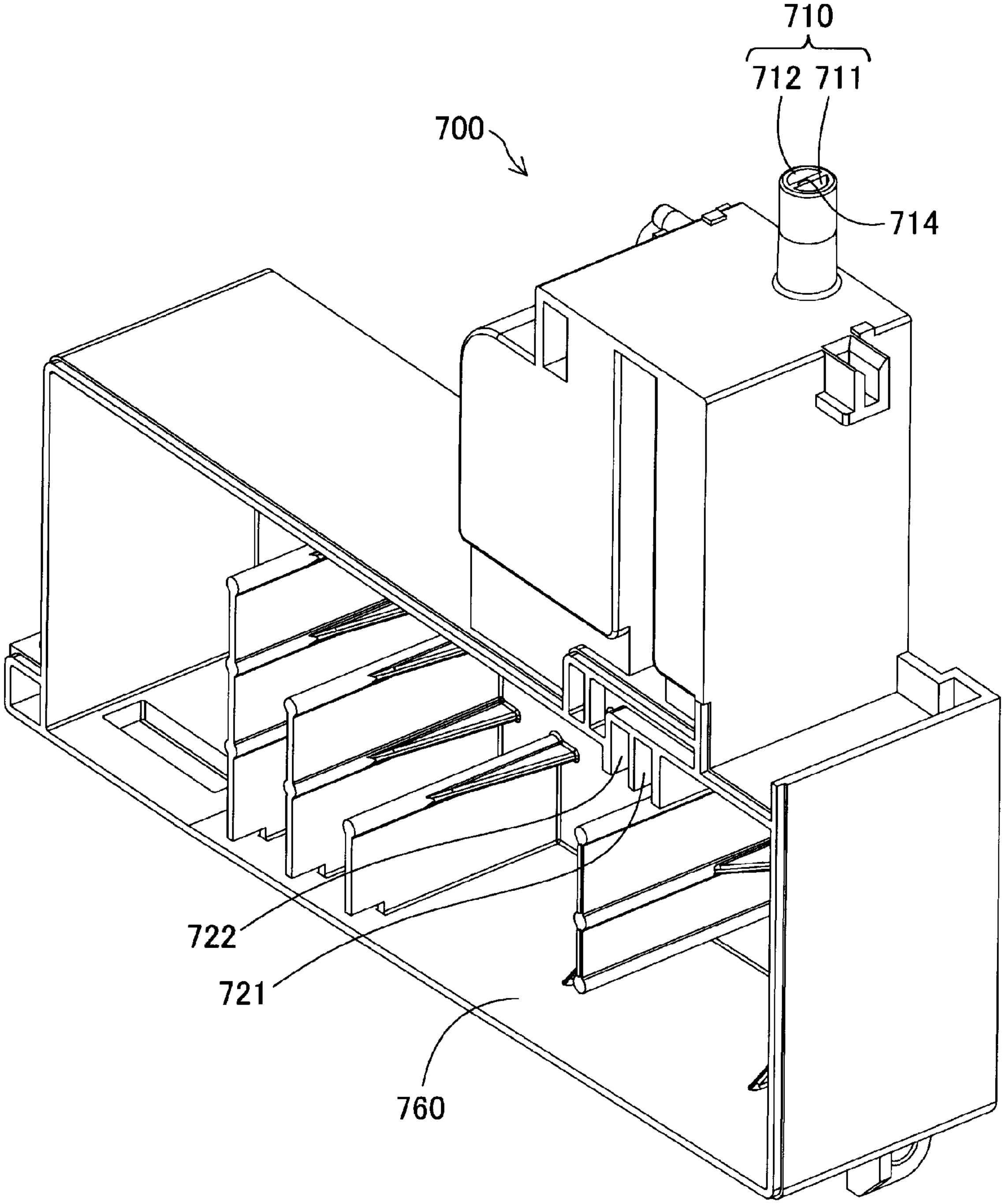
FIG. 8 is a perspective view of the ink tank according to the first embodiment.

FIG. 8 is a perspective view of the ink tank 700 according to the first embodiment. The ink inlet flow path member 710 of the ink tank 700 projects upward from the ink tank 700. The ink inlet flow path member 710 has two flow paths 711 and 712. The two flow paths 711 and 712 are divided by the partition wall 714. In the first embodiment, a tip surface of the ink inlet flow path member 710 is flat, and the two flow paths 711 and 712 are opened at the tip surface of the ink inlet flow path member 710, respectively. Further, a part of the tip surface of the ink inlet flow path member 710 corresponds to an end portion of the partition wall 714. At a time of ink replenishment, the fitting portion 450 of the ink replenishment container 200 is fitted into the recess portion 750 around the ink inlet flow path member 710 of the ink tank 700, and the ink replenishment container 200 is positioned in a circumferential direction. Therefore, the two flow paths 711 and 712 communicate with two in-tank flow paths 721 and 722 projecting into a lower ink storage chamber 760, respectively. Lower ends of these in-tank flow paths 721 and 722 extend below a ceiling wall of the ink storage chamber 760. The reason is that when ink is replenished from the ink replenishment container 200 to the ink tank 700, the air-liquid exchange is stopped when a liquid level in the ink storage chamber 760 reaches the lower ends of the in-tank flow paths 721 and 722, and the ink replenishment is accordingly stopped, so that the replenishment work of the ink is easy.

Figure 9:
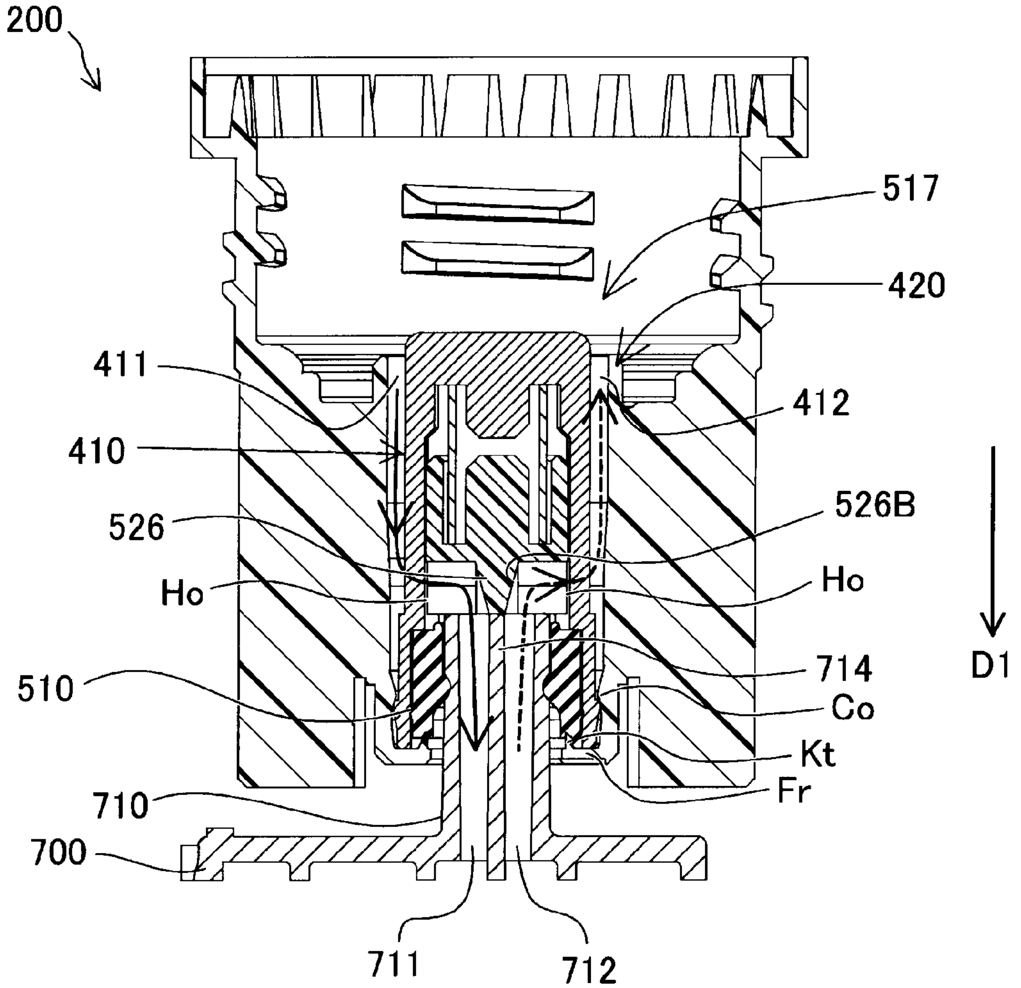
FIG. 9 is a cross-sectional view illustrating a replenishment state in which ink is replenished from the ink replenishment container to the ink tank.

FIG. 9 is a cross-sectional view illustrating a replenishment state in which ink is replenished from the ink replenishment container 200 to the ink tank 700. In this replenishment state, the ink replenishment container 200 has an inverted posture, and a direction on the tip side of the ink replenishment container 200 is a tip side direction D1. The tubular portion 420 has a flange portion Fr extending in the radial direction of the ink outlet 460 that can come into contact with a tip of the outlet valve unit 500 in the axial direction, an engagement projection Kt extending from the flange portion Fr toward the inside of the tubular portion 420 in the axial direction, and an annular projection portion Co that can be engaged with an annular projection portion Co2 which is an engaging portion provided at the outer periphery of the outlet valve unit 500. Here, the engagement projection Kt and the annular projection portion Co form a tubular portion side engaging portion. In FIG. 9, only a part of each of the ink replenishment container 200 and the ink tank 700 is illustrated. An engaging portion between the annular projection portion Co2 and the annular projection portion Co, and an engaging portion between the engagement projection Kt and a tip of the sealing member 510, particularly the latter engaging portion, also has an ink leakage sealing function.

The ink inlet flow path member 710 of the ink tank 700 is inserted into the tubular flow path portion 410 via the opening of the sealing member 510. A flow path (also referred to as "replenishment flow path") on the inner peripheral surface side of the tubular portion 420 than a center of the tubular flow path portion 410 in the radial direction is divided into two replenishment flow paths 411 and 412 formed in a gap between the valve housing 517 and an inner peripheral surface of the tubular portion 420. The gap forming the replenishment flow paths 411 and 412 also includes a gap via the through-hole Ho between the valve body 520 and the spring member 530 accommodated in the valve housing 517 and the inner peripheral surface of the tubular portion 420. Therefore, the gap can be said to be a gap via the through-hole Ho between the outlet valve unit 500 and the inner peripheral surface of the tubular portion 420. Further, as will be described below, in the ink replenishment state, one of the two replenishment flow paths 411 and 412 is used as a flow path of ink, and the other is used as a flow path of air. As a result, the ink replenishment container 200 can replenish the ink while the air-liquid exchange is performed with the ink tank 700. When the ink replenishment is performed by using the air-liquid exchange, it is not necessary to squeeze the container main body 300. As described above, a type of ink replenishment container capable of ink replenishment without squeezing the container main body 300 is also referred to as a "non-squeeze type". The flow path of the tubular flow path portion 410 does not need to be divided into the two replenishment flow paths 411 and 412 via the flow paths 711 and 712 of the ink inlet flow path member 710 and the through-holes Ho of the valve housing 517, and may be formed as one replenishment flow path. Further, the flow path of the tubular flow path portion 410 may be divided into three or more replenishment flow paths.

The outlet valve unit 500 is configured such that in the replenishment state, the replenishment flow paths 411 and 412 on the inner peripheral surface side of the tubular portion 420 than the center of the tubular flow path portion 410 in the radial direction communicate with the two flow paths 711 and 712 of the ink inlet flow path member 710. In order for the air and liquid to flow in and out through communication with the replenishment flow paths 411 and 412 and the two flow paths 711 and 712, it is necessary to be in the "valve open state" so that the air and liquid can be passed through the through-hole Ho.

The projection portion 526 of the valve body 520 is provided at a position facing the partition wall 714 of the ink inlet flow path member 710 in the axial direction. In the replenishment state, the projection portion 526 of the valve body 520 is pushed by the ink inlet flow path member 710 and retracts toward the container main body 300 side, and the two flow paths 711 and 712 of the ink inlet flow path member 710 respectively communicate with the replenishment flow paths 411 and 412 on the inner peripheral surface side of the tubular portion 420 than the center of the tubular flow path portion 410 in the radial direction through the through-hole Ho. Such a state is the "valve open state" described above. As a result, it is allowed that ink in the container main body 300 flows into the ink inlet flow path member 710 via the replenishment flow paths 411 and 412. In FIG. 9, solid arrows indicate a flow of the ink, and dashed arrows indicate a flow of the air. As described above, in the replenishment state, the two flow paths 711 and 712 of the ink inlet flow path member 710 and the two replenishment flow paths 411 and 412 of the tubular flow path portion 410 are used to efficiently replenish ink from the ink replenishment container 200 to the ink tank 700 while performing the air-liquid exchange. In order to smoothly perform this air-liquid exchange, it is preferable that the replenishment flow path of the tubular flow path portion 410 is divided into a plurality of replenishment flow paths. The same applies to an ink inlet flow path of the ink inlet flow path member 710. In this case, in the replenishment state, it is preferable that one or more of a plurality of replenishment flow paths communicate with one or more of a plurality of ink inlet flow paths, and the other one or more of the plurality of replenishment flow paths communicate with the other one or more of the plurality of ink inlet flow paths.

As described above, the projection portion 526 is formed such that a cross-sectional area in an orthogonal direction orthogonal to the axial direction on the rear end side is larger than the cross-sectional area on the tip side having the partition contact portion 526A in the axial direction. Therefore, since the cross-sectional area on a side in contact with the partition wall 714 is smaller than the cross-sectional area on a rear end side, it is difficult to obstruct the inflow of the ink and the outflow of the air through a plurality of flow paths, and it is possible to smoothly perform the air-liquid exchange. Further, since the rear end side becomes thicker, a strength when the projection portion 526 of the valve body 520 comes into contact with the partition wall 714 can be maintained, and the partition function can be appropriately maintained.

As illustrated in FIGS. 4 and 9, the projection portion 526 of the valve body 520 has an inclined surface 526B enlarged from the tip side to the rear end side. Therefore, since the gas and the liquid flow along the inclined surface 526B, mutual interference is reduced, so the liquid can be quickly replenished by smoothly performing the air-liquid exchange.

As illustrated in FIGS. 5 and 9, a center portion of the valve housing 517 on the rear end side is closed. Therefore, it is possible to prevent interference between the air and the liquid, smoothly perform the air-liquid exchange, and quickly replenish the ink.

Figure 10:
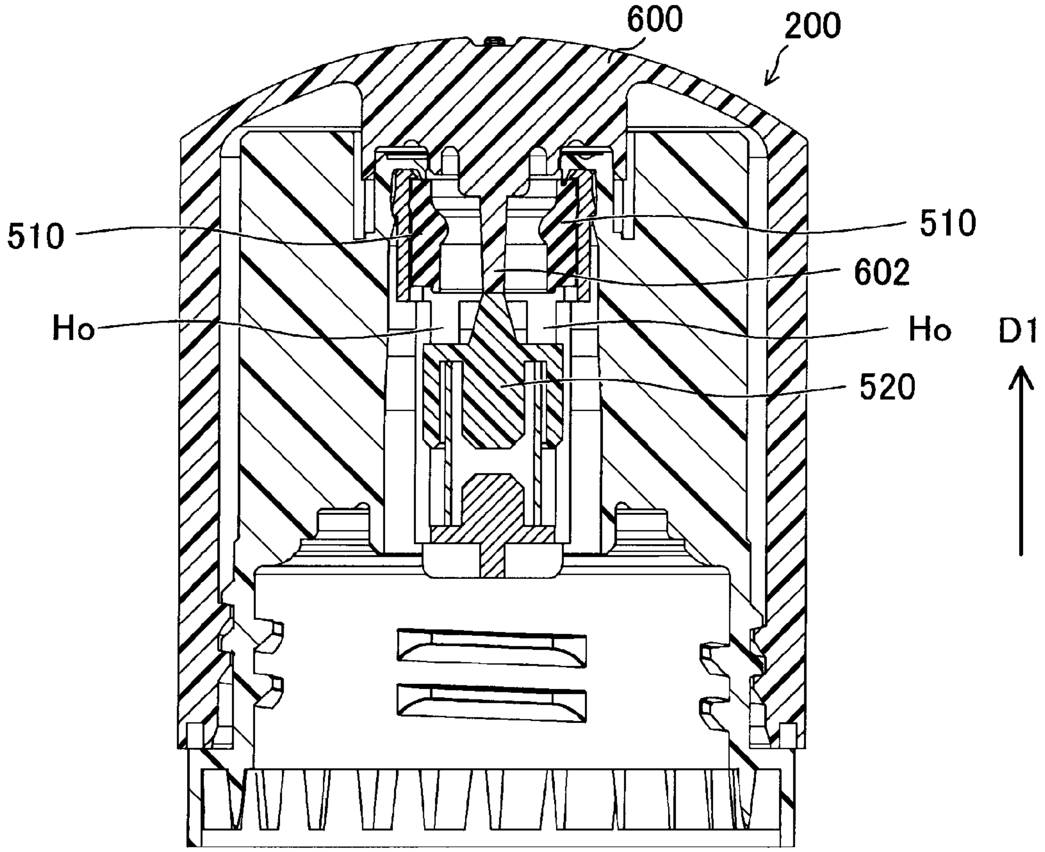
FIG. 10 is a cross-sectional view of the ink replenishment container when a cap is closed.
Figure 11:
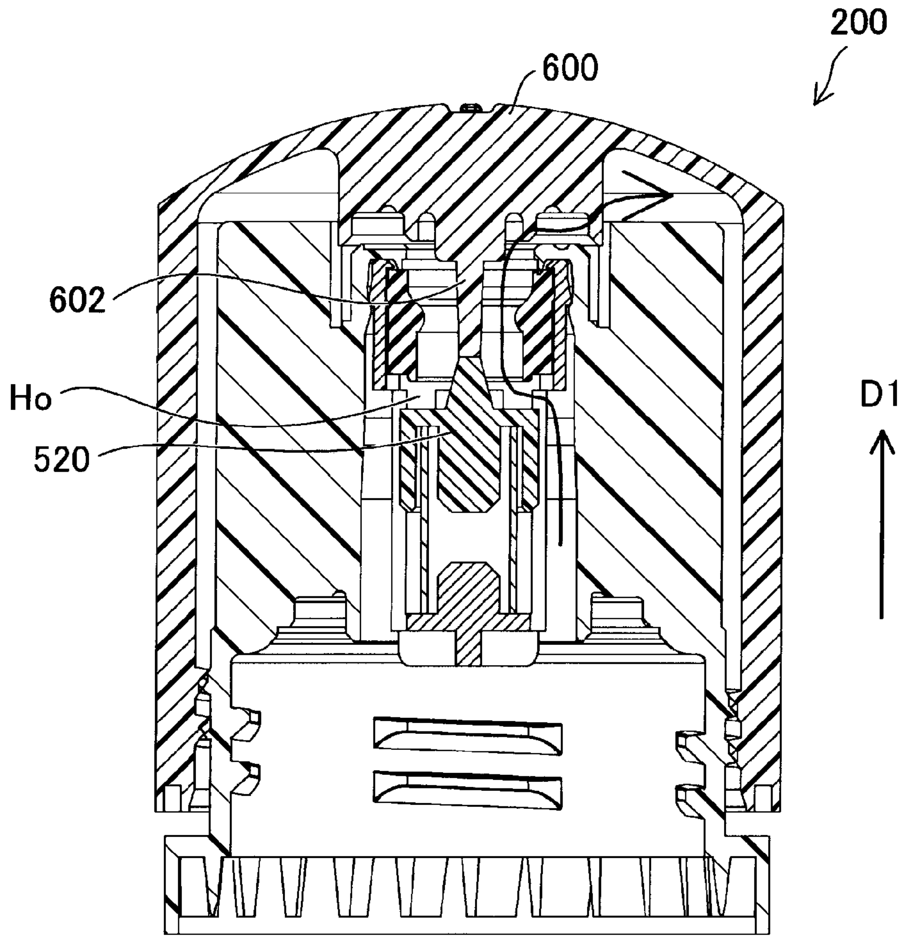
FIG. 11 is a cross-sectional view of the ink replenishment container in the middle of opening the cap.
Figure 12:
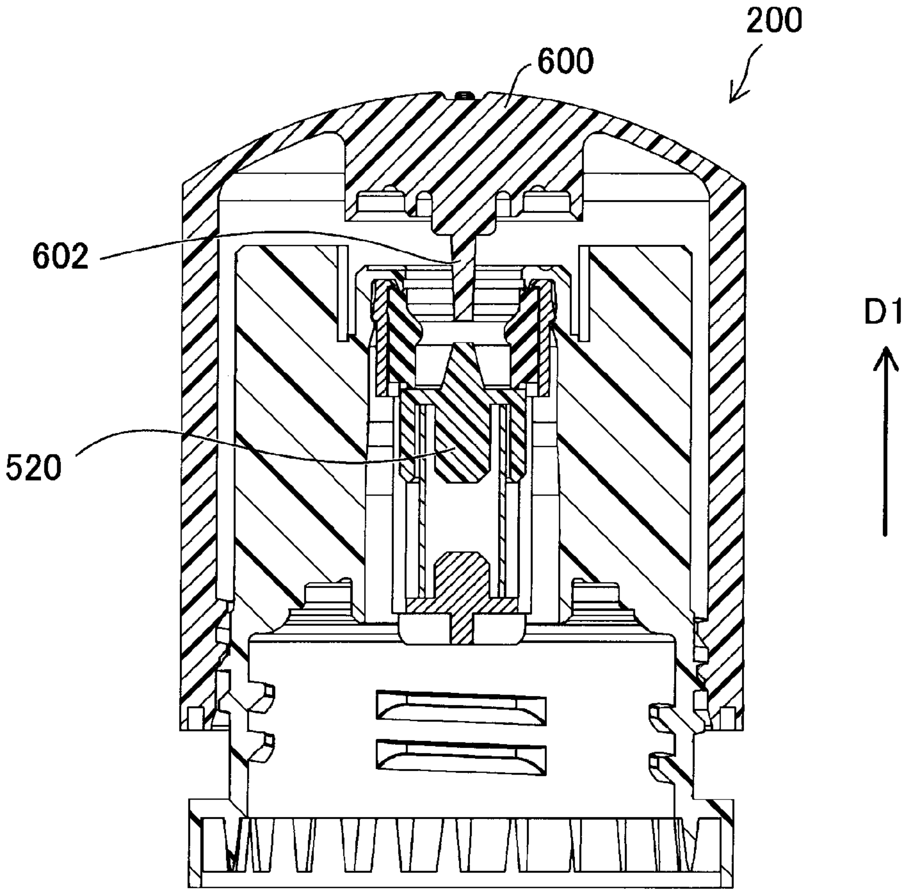
FIG. 12 is a cross-sectional view of the ink replenishment container when the cap is fully opened.

FIG. 10 is a cross-sectional view of the ink replenishment container 200 when the cap 600 is closed. FIG. 11 is a cross-sectional view of the ink replenishment container 200 in the middle of opening the cap 600. FIG. 12 is a cross-sectional view of the ink replenishment container 200 when the cap 600 is fully opened. An arrow in the ink replenishment container 200 illustrated in FIG. 11 indicates a flow when the atmosphere is open. As illustrated in FIGS. 10 to 12, the cap 600 has a projection 602. As illustrated in FIG. 10, in a state in which the cap 600 is closed, the projection 602 presses the valve body 520 toward the rear end side in the axial direction, so the valve open state is obtained. Therefore, the through-hole Ho is generated, and the through-hole Ho and each of the replenishment flow paths 411 and 412 communicate with each other. Since the cap 600 is closed, the atmosphere is not open. Meanwhile, the replenishment flow paths 411 and 412 communicate with the inside of the sealing member 510 in the diameter direction, via the through-hole Ho. As illustrated in FIG. 11, the valve body 520 moves toward the tip side in the axial direction and a length of the through-hole Ho in the axial direction is shortened, and when the cap is opened, the atmosphere is opened and an internal pressure is lowered. As illustrated in FIG. 12, the valve body 520 further moves in the tip side direction Dl and the through-hole Ho is closed, so the valve close state is obtained. Therefore, even when the cap 600 is fully opened, the ink does not leak. By providing the cap 600, when the internal pressure of the ink replenishment container 200 is increased by a change in temperature or atmospheric pressure, the internal pressure is released when the opening of the cap 600 from the closed state, so that the ink jet can be prevented.

With the first embodiment described above, air rises from one of a plurality of partitioned flow paths of the ink inlet flow path member 710, passes through the through-hole Ho of the valve housing 517, and enters the container main body 300 through a gap between the tubular portion 420 and the valve housing 517. On the other hand, ink in the container main body 300 passes through the through-hole Ho through the gap and flows into the other one of the plurality of flow paths. Therefore, the air and the liquid are more appropriately separated and the liquid can be quickly replenished by smooth air-liquid exchange, as compared with a configuration in which the air and the liquid pass through the valve housing 517.

In the first embodiment, in the replenishment state, the projection portion 526 of the valve body 520 comes into contact with the partition wall 714 of the ink inlet flow path member 710, so that the sealing member 510 and the valve body 520 are separated from each other, and the gap of the sealing member 510 and the valve body 520 communicates with the through-hole Ho of the valve housing 517. The replenishment flow paths 411 and 412, which are formed as a gap between the valve housing 517 and the inner peripheral surface of the tubular portion 420 in the tubular flow path portion 410 via the through-hole Ho, are configured to communicate with the flow paths 711 and 712 of the ink inlet flow path member 710. In this manner, by providing the projection portion 526 at a tip of the valve body 520 and providing the through-hole Ho in the valve housing 517, in the valve open state in which the projection portion 526 comes into contact with the partition wall 714 of the ink inlet flow path member 710, it is possible to easily realize an inter-flow-path communication state in which the flow paths 711 and 712 communicate with the through-hole Ho through the gap between the sealing member 510 and a tip of the cylindrical portion 524 of the valve body 520, and further communicate with the replenishment flow paths 411 and 412 formed as the gap between the valve housing 517 and the inner peripheral surface of the tubular portion 420.

Further, in the replenishment state, the sealing member 510 is in contact with the outer peripheral surface of the ink inlet flow path member 710, and seals an outer peripheral surface of the ink inlet flow path member 710. With this configuration, it is possible to prevent the ink from leaking to the outside, and it is possible to improve sealing performance for the outer peripheral surface of the ink inlet flow path member 710.

In addition, since in the projection portion 526 of the valve body 520, the cross-sectional area on a side in contact with the partition wall 714 is smaller than the cross-sectional area on a rear end side, it is difficult to obstruct the inflow of the ink and the outflow of the air through the plurality of flow paths, and it is possible to smoothly perform the air-liquid exchange. Further, since the rear end side becomes thicker, a strength when the projection portion 526 of the valve body 520 comes into contact with the partition wall 714 can be maintained, and the partition function can be appropriately maintained.

Further, since the gas and the liquid flow along the inclined surface 526B of the projection portion 526, mutual interference is reduced, so the liquid can be quickly replenished by smoothly performing the air-liquid exchange.

Further, since the rear end side of the valve housing 517 is closed, interference between air and liquid can be prevented, air-liquid exchange can be smoothly performed, and the ink can be quickly replenished.

Further, the valve body 520 has the cylindrical portion 524 facing the inner surface of the valve housing 517. The cylindrical portion 524 is configured to be slidable by being guided by the inner surface of the valve housing 517. Therefore, an opening and closing operation of the valve body 520 is appropriately performed.

Further, the cap 600 capable of covering the ink outlet 460 is provided, and the cap 600 has the projection 602 that presses the valve body 520 in a state in which the cap 600 closed to obtain the valve open state. Therefore, when the internal pressure of the ink replenishment container 200 is increased by a change in temperature or atmospheric pressure, the internal pressure is released when the opening of the cap 600 from the closed state, so that the ink jet can be prevented.

Further, the valve housing 517 has the retaining portion 517A of the sealing member 510 on the tip side and the engaging portion 517B with the tubular portion 420, and is detachably configured in the tubular portion 420. Therefore, the outlet valve unit 500 is integrated in a state of being assembled with the tubular portion 420. In addition, since the outlet valve unit 500 is detachable by itself, it is easy to manufacture or handle the outlet valve unit 500, and the outlet valve unit 500 can be transported by itself, and the outlet valve unit 500 can be replaced when the ink replenishment container 200 is reused. Further, since the sealing member 510 is suppressed from falling off, the sealing member 510 can be reliably accommodated in the valve housing 517, and a positional relationship with the valve body is appropriately maintained. Further, since a separate stopper member may not be mounted, it is possible to suppress an increase in components or an increase in manufacturing steps.

The "partition wall 714" in the first embodiment corresponds to the "partition" of the present disclosure.

B. Other Embodiments

B-1. Other Embodiment 1

In the first embodiment described above, the ink replenishment container 200 includes the outlet valve unit 500, which is a spring valve unit including the spring member 530 housed in the valve housing 517 of the tubular portion 420, and the present disclosure is not limited to this. The ink replenishment container 200 may include an outlet valve unit provided with a slit valve, instead of the outlet valve unit 500, which is a spring valve unit. The ink replenishment container 200 may be configured such that an outlet valve unit having an engaging portion capable of engaging with each of the engagement projection Kt of the tubular portion 420 and the annular projection portion Co, which is an outlet valve unit provided with a slit valve having a slit through which the ink inlet flow path member 710 can be inserted and removed in the diameter direction of the valve body 520, can be replaced with the spring valve unit. Therefore, when the supply of the outlet valve unit becomes insufficient, the outlet valve unit can be replaced with the slit valve unit, the other parts of the ink outlet forming portion 400 are commonized, and manufacturing or maintenance is facilitated. Further, when the ink replenishment container 200 is reused, it is possible to easily change the spring valve unit to be detached and the slit valve unit to be attached, or the slit valve unit to be detached and the spring valve unit to be attached.

B-2. Other Embodiment 2

In the first embodiment described above, the ink replenishment container 200 includes the cap 600, and the cap 600 may not be provided.

B-3. Other Embodiment 3

In the ink replenishment container 200 according to the first embodiment described above, the valve housing 517 is detachably configured in the tubular portion 420, and may be integrated without being detachable.

C. Other Aspects

The present disclosure is not limited to the embodiments described above, and can be realized in various configurations without departing from the spirit thereof. For example, the technical features in the embodiments corresponding to technical features in each aspect to be described below can be replaced or combined as appropriate to solve some or all of the problems described above, or to achieve some or all of the effects described above. Further, when the technical feature is not described as essential in the present specification, the technical feature can be appropriately deleted.

(1) According to a first aspect of the present disclosure, there is provided an ink replenishment container for replenishing ink into ink tank of a printer via an ink inlet flow path member having a plurality of flow paths partitioned by a partition. The ink replenishment container includes: a container main body configured to accommodate the ink; an ink outlet forming portion coupled to the container main body and including a tubular portion having an ink outlet; and an outlet valve unit mounted in the tubular portion, in which the outlet valve unit includes a valve housing mounted to provide a gap with an inner peripheral surface of the tubular portion in the tubular portion, a sealing member mounted in the valve housing and having an opening through which the ink inlet flow path member is inserted and removed, and a valve body mounted in the valve housing to be movable in a central axis direction of the ink outlet, and movable between a valve close state in which the valve body is in contact with the sealing member and a valve open state in which the valve body is pressed by the ink inlet flow path member and separated from the sealing member, the valve body includes a partition contact portion having an end surface configured to come into contact with the partition of the ink inlet flow path member, and the valve housing includes a through-hole which communicates with the gap, and the through-hole communicates with the ink inlet flow path member in the valve open state. With this aspect, air rises from one of a plurality of partitioned flow paths of the ink inlet flow path member, passes through the through-hole of the valve housing, and enters the container main body through a gap between the tubular portion and the valve housing. On the other hand, ink in the container main body passes through the through-hole through the gap and flows into the other one of the plurality of flow paths. Therefore, the air and the liquid are more appropriately separated and the liquid can be quickly replenished by smooth air-liquid exchange, as compared with when the air and the liquid pass through the valve housing.

(2) In the aspect described above, the partition contact portion of the valve body may be provided at a projection portion included in the valve body, and the projection portion may be formed such that a cross-sectional area in a direction orthogonal to the central axis direction on a rear end side is larger than a cross-sectional area on a tip side having the partition contact portion. With this aspect, since the cross-sectional area on a side in contact with the partition is smaller than the cross-sectional area on a rear end side, it is difficult to obstruct the inflow of the ink and the outflow of the air through a plurality of flow paths, and it is possible to smoothly perform the air-liquid exchange. Further, since the rear end side becomes thicker, a strength when the projection portion of the valve body comes into contact with the partition can be maintained, and the partition function can be appropriately maintained.

(3) In the aspect described above, the projection portion of the valve body may have an inclined surface enlarged from the tip side to the rear end side. With this aspect, since the gas and the liquid flow along the inclined surface, mutual interference is reduced, so the liquid can be quickly replenished by smoothly performing the air-liquid exchange.

(4) In the aspect described above, a center portion of the valve housing on a rear end side may be closed. With this aspect, it is possible to prevent interference between the air and the liquid, smoothly perform the air-liquid exchange, and quickly replenish the ink.

(5) In the aspect described above, the valve body may have a cylindrical portion facing an inner surface of the valve housing, and the cylindrical portion may be configured to be guided and slid by the inner surface. With this aspect, an opening and closing operation of the valve body is appropriately performed.

(6) In the aspect described above, the outlet valve unit may include a spring member housed and supported in the valve housing, and the spring member may urge the valve body toward the sealing member in the valve close state. With this aspect, since the spring member is housed in the valve housing, it is easy to handle when assembling into the ink replenishment container. Further, a positional relationship between the spring member, the valve body, and the sealing member can be easily maintained.

(7) In the aspect described above, the valve housing may have a retaining portion of the sealing member. With this aspect, the sealing member can be reliably accommodated in the valve housing, and a positional relationship with the valve body is appropriately maintained. Further, since a separate stopper member may not be mounted, it is possible to suppress an increase in components or an increase in manufacturing steps.

(8) The aspect described above may further include a cap configured to cover the ink outlet, in which the cap may have a projection that presses the valve body in a state in which the cap is closed to obtain the valve open state. With this aspect, when an internal pressure of the ink replenishment container is increased by a change in temperature or atmospheric pressure, the internal pressure is released when the opening of the cap from the closed state, so that the ink jet can be prevented.

(9) According to a second aspect of the present disclosure, there is provided an ink replenishment container that communicates with an ink tank of a printer to replenish ink into the ink tank via an ink inlet flow path member having a plurality of flow paths partitioned by a partition. The ink replenishment container includes: a container main body configured to accommodate the ink; an ink outlet forming portion coupled to the container main body and including a tubular portion having an ink outlet; and an outlet valve unit mounted in the tubular portion, in which the outlet valve unit includes a valve housing that has an engaging portion with the tubular portion and is detachably mounted in the tubular portion via the engaging portion, a spring member housed and supported in the valve housing, a sealing member mounted in the valve housing, located on a tip side of the ink outlet than the spring member in a central axis direction of the ink outlet, and having an opening through which the ink inlet flow path member is inserted and removed, and a valve body mounted to be movable in the central axis direction in the valve housing, and movable between a valve close state in which the valve body is in contact with the sealing member by urging of the spring member and a valve open state in which the valve body is pressed by the ink inlet flow path member in a direction opposite to the urging direction and separated from the sealing member, and the valve housing has a retaining portion of the sealing member. With this aspect, since the outlet valve unit is detachable by itself, it is easy to manufacture the outlet valve unit, the outlet valve unit can be transported by itself, and the outlet valve unit can be replaced when the ink replenishment container is reused. In addition, the sealing member can be reliably accommodated in the valve housing, and a positional relationship with the valve body is appropriately maintained. Further, since a separate stopper member may not be mounted, it is possible to suppress an increase in components or an increase in manufacturing steps.

(10) According to a third aspect of the present disclosure, there is provided an ink replenishment container for replenishing ink into an ink tank of a printer via an ink inlet flow path member having a plurality of flow paths partitioned by a partition. The ink replenishment container may include: a container main body configured to accommodate the ink; an ink outlet forming portion coupled to the container main body and including a tubular portion having an ink outlet; and an outlet valve unit mounted in the tubular portion, in which the tubular portion may have a tubular portion side engaging portion configured to engage with the outlet valve unit, and the outlet valve unit may be configured such that a spring valve unit and a slit valve unit are interchanged and selectively mounted, the spring valve unit including a valve housing having an engaging portion configured to engage with the tubular portion side engaging portion of the tubular portion, a spring member housed and supported in the valve housing, a sealing member mounted in the valve housing, located on a tip side of the ink outlet than the spring member in a central axis direction of the ink outlet, and having an opening through which the ink inlet flow path member is inserted and removed, and a valve body mounted to be movable in the central axis direction in the valve housing, and movable between a valve close state in which the valve body is in contact with the sealing member by urging of the spring member and a valve open state in which the valve body is pressed by the ink inlet flow path member in a direction opposite to the urging direction and separated from the sealing member, and the slit valve unit including a slit valve having a slit through which the ink inlet flow path member is inserted into and removed from the valve body, the slit valve unit having an engaging portion configured to engage with the tubular portion side engaging portion. With this aspect, when the supply of the spring valve unit becomes insufficient, the outlet valve unit can be replaced with the slit valve unit. Further, when the ink replenishment container is reused, it is possible to easily change the spring valve unit to be detached and the slit valve unit to be attached, or the slit valve unit to be detached and the spring valve unit to be attached.

(11) In the aspect described above, the tubular portion may have a flange portion that can come into contact with the tip of the outlet valve unit in the central axis direction and extends in the radial direction of the ink outlet, the tubular portion side engaging portion may have an engagement projection extending from the flange portion toward the inside of the tubular portion in the central axis direction, and an annular projection portion that can be engaged with an outer periphery of the outlet valve unit, and the engaging portion may be configured to engage with the engagement projection and the annular projection portion, respectively. With this aspect, the slit valve unit can be easily attached instead of the spring valve unit. The outlet valve unit can be easily attached by pushing the outlet valve unit from the rear end side of the tubular portion toward the tip side until the outlet valve unit contacts with the engagement projection of the flange portion. Further, when the ink replenishment container is reused, it is possible to easily change the spring valve unit to be detached and the slit valve unit to be attached, or the slit valve unit to be detached and the spring valve unit to be attached.

The present disclosure can be realized in aspects such as a method of manufacturing an ink replenishment container in addition to the aspects described above.

What is claimed is:

1. An ink replenishment container for replenishing ink into an ink tank of a printer via an ink inlet flow path member having a plurality of flow paths partitioned by a partition, the ink replenishment container comprising:

a container main body configured to accommodate the ink;

an ink outlet forming portion coupled to the container main body and including a tubular portion having an ink outlet; and an outlet valve unit mounted in the tubular portion, wherein the outlet valve unit includes a valve housing mounted in the tubular portion, the valve housing configured to provide a gap with an inner peripheral surface of the tubular portion in the tubular portion, a sealing member mounted in the valve housing and having an opening through which the ink inlet flow path member is inserted and removed, and a valve body mounted in the valve housing to be movable in a central axis direction of the ink outlet, and movable between a valve close state in which the valve body is in contact with the sealing member and a valve open state in which the valve body is pressed by the ink inlet flow path member and separated from the sealing member, the valve body includes a partition contact portion having an end surface configured to contact with the partition of the ink inlet flow path member, and the valve housing includes a through-hole which communicates with the gap, and the through-hole communicates with the ink inlet flow path member in the valve open state.

2. The ink replenishment container according to claim 1, wherein the partition contact portion of the valve body is provided at a projection portion included in the valve body, and the projection portion is formed such that a cross-sectional area in a direction orthogonal to the central axis direction on a rear end side is larger than a cross-sectional area on a tip side having the partition contact portion.

3. The ink replenishment container according to claim 2, wherein the projection portion of the valve body has an inclined surface enlarged from the tip side to the rear end side.

4. The ink replenishment container according to claim 1, wherein a center portion of the valve housing on a rear end side is closed.

5. The ink replenishment container according to claim 1, wherein the valve body has a cylindrical portion facing an inner surface of the valve housing, and the cylindrical portion is configured to be guided and slid by the inner surface.

6. The ink replenishment container according to claim 1, wherein the outlet valve unit includes a spring member housed and supported in the valve housing, and the spring member urges the valve body toward the sealing member in the valve close state.

7. The ink replenishment container according to claim 1, wherein the valve housing has a retaining portion of the sealing member.

8. The ink replenishment container according to claim 1, further comprising:

a cap configured to cover the ink outlet, wherein the cap has a projection that presses the valve body in a state in which the cap is closed to obtain the valve open state.

9. An ink replenishment container for replenishing ink into an ink tank of a printer via an ink inlet flow path member having a plurality of flow paths partitioned by a partition, the ink replenishment container comprising:

a container main body configured to accommodate the ink;

an ink outlet forming portion coupled to the container main body and including a tubular portion having an ink outlet; and an outlet valve unit mounted in the tubular portion, wherein the outlet valve unit includes a valve housing that has an engaging portion with the tubular portion and is detachably mounted in the tubular portion via the engaging portion, a spring member housed and supported in the valve housing, a sealing member mounted in the valve housing, located on a tip side of the ink outlet from the spring member in a central axis direction of the ink outlet, and having an opening through which the ink inlet flow path member is inserted and removed, and a valve body mounted to be movable in the central axis direction in the valve housing, and movable between a valve close state in which the valve body is in contact with the sealing member by urging of the spring member and a valve open state in which the valve body is pressed by the ink inlet flow path member in a direction opposite to the urging direction and separated from the sealing member, and the valve housing has a retaining portion of the sealing member.

10. An ink replenishment container for replenishing ink into an ink tank of a printer via an ink inlet flow path member having a plurality of flow paths partitioned by a partition, the ink replenishment container comprising:

a container main body configured to accommodate the ink;

an ink outlet forming portion coupled to the container main body and including a tubular portion having an ink outlet; and an outlet valve unit mounted in the tubular portion, wherein the tubular portion has a tubular portion side engaging portion configured to engage with the outlet valve unit, and the outlet valve unit is configured such that a spring valve unit and a slit valve unit are interchanged and selectively mounted, the spring valve unit including a valve housing having an engaging portion configured to engage with the tubular portion side engaging portion of the tubular portion, a spring member housed and supported in the valve housing, a sealing member mounted in the valve housing, located on a tip side of the ink outlet from the spring member in a central axis direction of the ink outlet, and having an opening through which the ink inlet flow path member is inserted and removed, and a valve body mounted to be movable in the central axis direction in the valve housing, and movable between a valve close state in which the valve body is in contact with the sealing member by urging of the spring member and a valve open state in which the valve body is pressed by the ink inlet flow path member in a direction opposite to the urging direction and separated from the sealing member, and the slit valve unit including a slit valve having a slit through which the ink inlet flow path member is inserted into and removed from a body of the slit valve, the slit valve unit having an engaging portion configured to engage with the tubular portion side engaging portion.

* * * * *